(12) United States Patent
Bleyer et al.

(10) Patent No.: US 10,643,341 B2
(45) Date of Patent: May 5, 2020

(54) REPLICATED DOT MAPS FOR SIMPLIFIED DEPTH COMPUTATION USING MACHINE LEARNING

(71) Applicant: MICROSOFT TECHNOLOGY LICENSING, LLC, Redmond, WA (US)

(72) Inventors: Michael Bleyer, Seattle, WA (US); Yuri Pekelny, Seattle, WA (US); Raymond Kirk Price, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 128 days.

(21) Appl. No.: 15/928,787

(22) Filed: Mar. 22, 2018

(65) Prior Publication Data
US 2019/0295269 A1  Sep. 26, 2019

(51) Int. Cl.
| | | |
|---|---|---|
| G06T 7/521 | (2017.01) | |
| G06T 7/593 | (2017.01) | |
| H04N 13/366 | (2018.01) | |
| G06T 19/00 | (2011.01) | |
| H04N 13/254 | (2018.01) | |
| G01B 11/25 | (2006.01) | |

(Continued)

(52) U.S. Cl.
CPC .......... *G06T 7/521* (2017.01); *G01B 11/2513* (2013.01); *G01B 11/2545* (2013.01); *G06T 7/586* (2017.01); *G06T 7/593* (2017.01); *G06T 19/006* (2013.01); *H04N 13/254* (2018.05); *H04N 13/366* (2018.05); *G02B 2027/0127* (2013.01)

(58) Field of Classification Search
None
See application file for complete search history.

(56) References Cited

U.S. PATENT DOCUMENTS

2005/0219552 A1* 10/2005 Ackerman ............. A61B 1/042
356/603
2009/0073324 A1    3/2009 Tan et al.
(Continued)

FOREIGN PATENT DOCUMENTS

WO    2017139871 A1    8/2017

OTHER PUBLICATIONS

U.S. Appl. No. 61/812,232 Specification pp. 1-8, Apr. 15, 2013, Provisional Document of US PG-Pub 2014/0307055 Kang et al, published 2014 (Year: 2014).*

(Continued)

*Primary Examiner* — Kim Y Vu
*Assistant Examiner* — Nathan J Bloom
(74) *Attorney, Agent, or Firm* — Workman Nydegger

(57) ABSTRACT

Disclosed embodiments include methods and systems for utilizing a structured projection pattern to perform depth detection. In some instances, the structured projection pattern forms a dot pattern, which is projected by an infrared (IR) illuminator, wherein the dot pattern includes a replicated sub-pattern having a predefined height and width. The sub-pattern is replicated in at least one direction such that the dot pattern comprises a plurality of replicated sub-patterns that are adjacently positioned.

20 Claims, 8 Drawing Sheets

(51) Int. Cl.
*G06T 7/586* (2017.01)
*G02B 27/01* (2006.01)

(56) References Cited

U.S. PATENT DOCUMENTS

| | | | |
|---|---|---|---|
| 2013/0100256 A1* | 4/2013 | Kirk | G06T 7/593 |
| | | | 348/48 |
| 2014/0104416 A1* | 4/2014 | Giordano | G01B 11/02 |
| | | | 348/135 |
| 2014/0292817 A1 | 10/2014 | Iversen et al. | |
| 2014/0307055 A1 | 10/2014 | Kang et al. | |
| 2015/0054734 A1 | 2/2015 | Raghoebardajal et al. | |
| 2015/0229915 A1* | 8/2015 | Kirk | H04N 5/33 |
| | | | 348/51 |
| 2015/0302648 A1 | 10/2015 | Zhang | |
| 2015/0316767 A1 | 11/2015 | Ebstyne et al. | |
| 2016/0005219 A1* | 1/2016 | Powell | G06F 3/0425 |
| | | | 345/426 |
| 2016/0259168 A1 | 9/2016 | Katz et al. | |
| 2016/0260251 A1 | 9/2016 | Stafford et al. | |
| 2016/0360970 A1 | 12/2016 | Tzvieli et al. | |
| 2017/0092220 A1 | 3/2017 | Mullins et al. | |
| 2017/0094251 A1 | 3/2017 | Wolke et al. | |
| 2017/0142312 A1* | 5/2017 | Dal Mutto | H04N 5/332 |
| 2017/0148169 A1* | 5/2017 | Kyung | H04N 9/045 |
| 2017/0161561 A1 | 6/2017 | Marty et al. | |
| 2017/0322309 A1* | 11/2017 | Godbaz | H04N 13/254 |
| 2017/0322310 A1* | 11/2017 | Godbaz | H04N 13/254 |
| 2018/0046874 A1 | 2/2018 | Guo et al. | |
| 2018/0061034 A1 | 3/2018 | Zhao et al. | |
| 2018/0061056 A1* | 3/2018 | Zhao | G06K 9/52 |
| 2018/0075659 A1 | 3/2018 | Browy et al. | |
| 2018/0247424 A1* | 8/2018 | Bleyer | G06T 7/593 |
| 2018/0276467 A1 | 9/2018 | Kaehler | |
| 2019/0072770 A1 | 3/2019 | Hall | |
| 2019/0072771 A1 | 3/2019 | Hall | |
| 2019/0304116 A1 | 10/2019 | Price et al. | |

OTHER PUBLICATIONS

"International Search Report & Written Opinion Issued in PCT Application No. PCT/US19/023051", dated May 24, 2019, 13 Pages. (MS# 403961-WO-PCT).

Weng, et al., "Study on an indoortracking system with infrared projected markers for large-area applications", In Proceedings of VRCAI ACM siggraph international conference on virtual reality continuum and its applications in industry, Dec. 14, 2009, 8 Pages.

"Non Final Office Action Issued in U.S. Appl. No. 15/937,195", dated May 29, 2019, 16 Pages. (MS# 403961-US-NP).

International Search Report and Written Opinion Issued in PCT Patent Application No. PCT/US19/022163, dated Jul. 1, 2019, 11 Pages. (MS# 403958-WO-PCT).

"Notice of Allowance Issued in U.S. Appl. No. 15/937,195", dated Oct. 10, 2019, 15 Pages. (MS# 403961-US-NP).

* cited by examiner

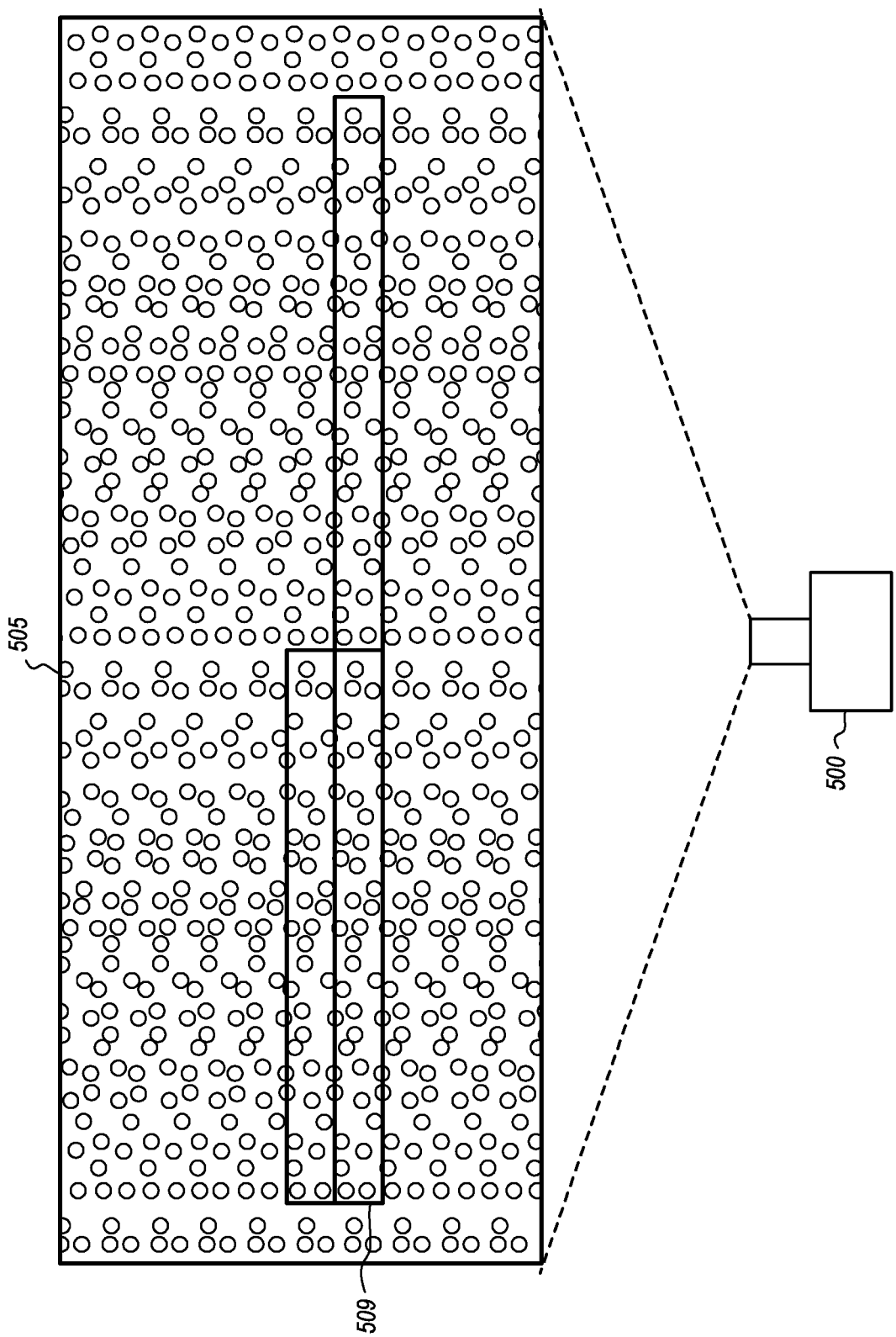

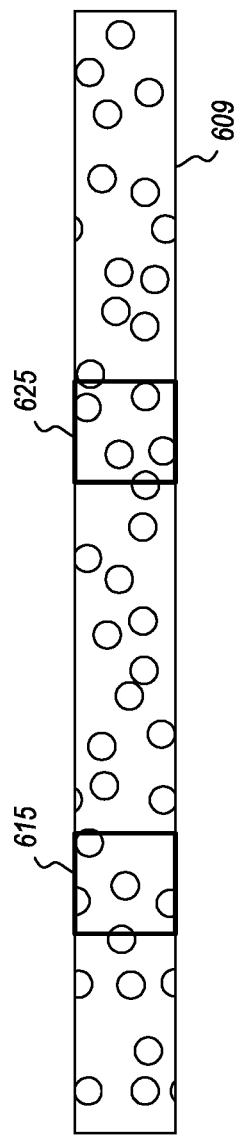

*700*

701 — Projecting An Infrared (IR) Dot Pattern Into An Environment Having One Or More Objects Within A Field Of View Of A Camera System And That Is Reflected Off Of The One Or More Objects As IR Dot Pattern Light, Wherein The Dot Pattern Comprises A Replicated Sub-Pattern That Is Replicated In At Least One Direction

703 — Obtaining A First Image Of The Reflected IR Dot Pattern Light With A First Camera And Obtaining A Second Image Thereof With A Second Camera

705 — Reprojecting The First And Second Images To Generate First And Second Rectified Images, Which Include Corresponding Parallel Scanlines

707 — Using Image Patches In The Reprojected Images To Determine A Depth Of The One Or More Objects

*Figure 7*

REPLICATED DOT MAPS FOR SIMPLIFIED DEPTH COMPUTATION USING MACHINE LEARNING

BACKGROUND

Mixed-reality systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

The disclosed mixed-reality systems use one or more on-body devices (e.g., the HMD, a handheld device, etc.). The HMD provides a display that enables a user to view overlapping and/or integrated visual information in whatever environment the user is in, be it a VR environment or an AR environment. By way of example, as shown in FIG. 1, a mixed-reality system may present virtual content to a user in the form of a simulated vase resting on a real table surface.

Continued advances in hardware capabilities and rendering technologies have greatly improved how mixed-reality systems render virtual objects. However, the process of immersing a user into a mixed-reality environment creates many challenges, difficulties, and costs, particularly with regard to determining three-dimensional spatial information around the user and tracking a user's movement so the visual display of information can be correctly presented to the user.

For instance, by way of example, conventional passive stereo depth detection systems fail to adequately determine the depth of a smooth or low texture surface (e.g., a wall) in a mixed-reality environment because those systems fail to adequately distinguish one part of the smooth/textureless surface from another part. As such, there is a substantial need to improve how depth is detected, especially for smooth/textureless surfaced objects in mixed-reality environments.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include methods and systems for utilizing a structured projection pattern to perform depth detection. In some instances, the structured projection pattern forms a dot pattern, which is projected by an infrared (IR) illuminator, wherein the dot pattern includes a replicated sub-pattern having a predefined height and width. The sub-pattern is replicated in at least one direction such that the dot pattern comprises a plurality of replicated sub-patterns that are adjacently positioned.

In some embodiments, the IR illuminator projects the structured projection pattern into an environment with one or more objects within the field of view of a camera system. The structured projection pattern is reflected off of the object(s), and the camera system obtains at least one image of the reflected structured projection pattern. Finally, the system utilizes the image(s) to perform depth detection.

In certain embodiments, the system performs depth detection through a stereo matching approach, by determining matches in pixel patches between corresponding scanlines of two captured images to calculate disparity and corresponding relative depth. In other embodiments, the system performs depth detection through a structured light approach, by determining matches in pixel patches between a captured image and a virtual image to calculate the disparity and corresponding depth.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 also illustrates a table and a virtual object (i.e., the vase) that are visible to the user of the HMD.

FIG. 5 shows an exemplary dot pattern being projected by an IR dot pattern illuminator.

FIG. 6 shows a sub-pattern of the dot pattern projected by the IR dot pattern illuminator in FIG. 5.

FIG. 7 illustrates an exemplary flow diagram representing a method for performing depth detection utilizing a dot pattern and a stereo matching approach.

DETAILED DESCRIPTION

Figure 1:
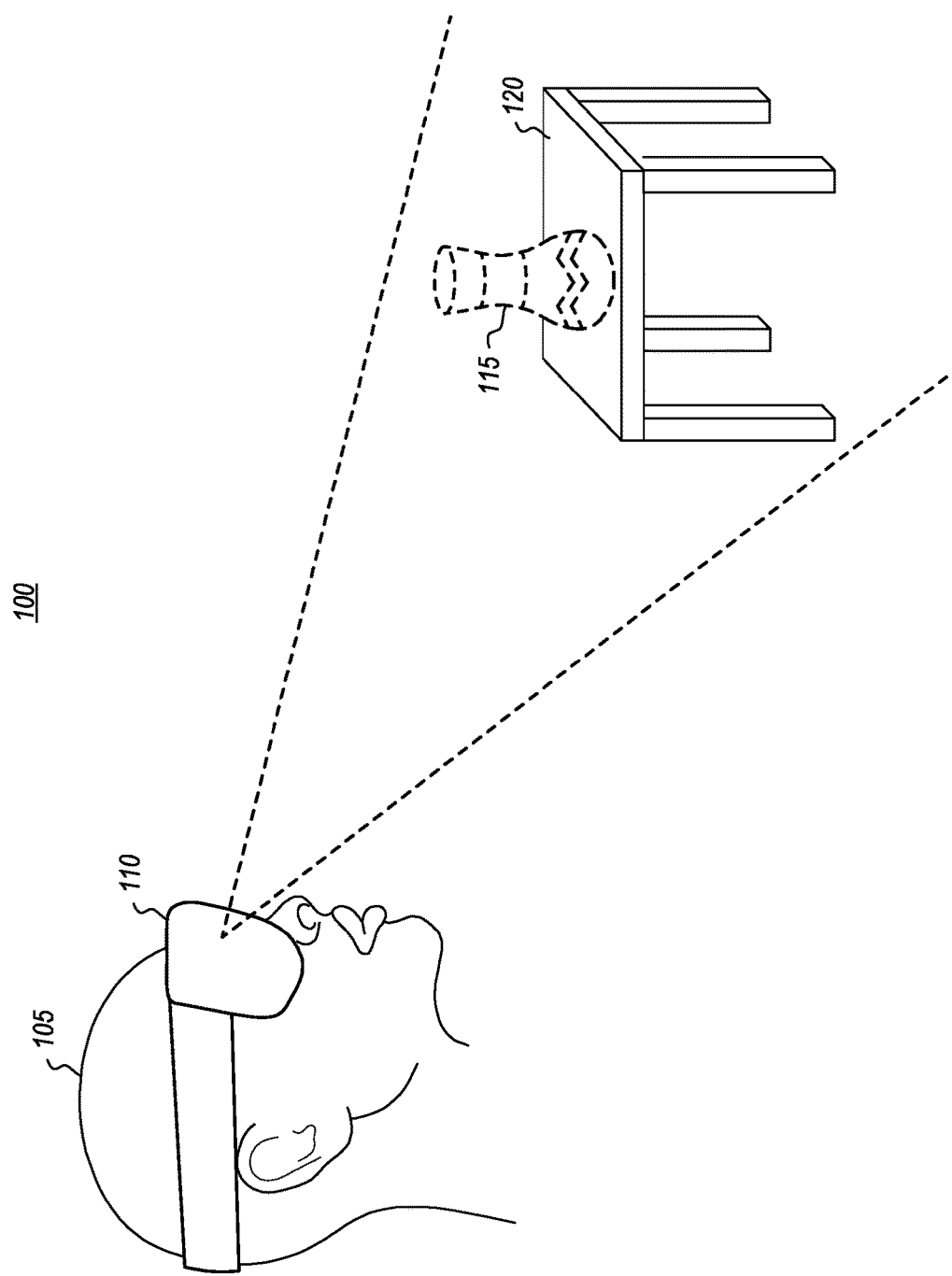
FIG. 1 shows a head-mounted device (HMD) structed to determine the depth of an object in its surrounding environment.

Disclosed embodiments include methods and systems for performing depth detection and which may be performed to further generate 3D surface reconstruction of the environment surrounding the head-mounted devices (HMDs) or other systems performing the depth detection.

In some embodiments, a HMD is configured with a camera system that performs the depth detection and that includes a stereo camera pair comprising a first and second camera. In stereo camera implementations, both cameras are mounted to the HMD, and may be configured to detect both visible light and infrared (IR) light. In many instances, the cameras are positioned to capture a large portion of the surrounding environment, which is beneficial for instances in which the HMD is also performing motion tracking. For stereo matching implementations, at least a part of the cameras' fields of view overlap with one another to form an overlapping field of view region.

The HMD also includes one or more structured projection pattern illuminator(s) (referred to herein as either illuminator or illuminators). The illuminator is configured to emit an IR dot pattern which includes a replicated sub-pattern with a predefined height and width. The sub-pattern is replicated in either one or both the horizontal and vertical directions such that the IR dot pattern comprises a plurality of replicated sub-patterns that are adjacently positioned. In some instances, the width of the sub-pattern corresponds to a maximum disparity search parameter over which the HMD will search for pixel matches. In some instances, the height of the sub-pattern corresponds to the height of the search window used in a patch-based stereo matching algorithm.

The illuminator is positioned/mounted on the HMD in such a manner as to project the IR dot pattern over one or more objects within an illumination area surrounding the HMD. The illumination area also at least partially overlaps with the previously mentioned overlapping field of view region of the camera system. This configuration allows both cameras in the stereo camera system to simultaneously capture the IR dot pattern light reflected by the one or more objects within the illumination area. By capturing the IR dot pattern reflections, the HMD is able to perform stereo matching by comparing pixel patches between corresponding scanlines in rectified images captured by the stereo camera system (e.g., through machine learning or more traditional stereo algorithms such as block matching). The HMD is thus configured to determine the depth of the objects in the surrounding environment and may perform 3D surface reconstruction.

It will be appreciated that the disclosed embodiments provide significant improvements over how HMDs perform depth detection, especially for objects with smooth (e.g., relatively textureless) surfaces. In particular, in at least some instances, the disclosed embodiments enable stereo matching to be utilized to determine the depth of objects with smooth/textureless surfaces. Additionally, the disclosed embodiments may operate to significantly simplify depth computation processes, by utilizing more predictable/replicated pixel patches, and thereby reduce the computational burden and resource allocation associated therewith. For instance, the replicated nature of the disclosed IR dot patterns enables resource-efficient utilization of machine learning in pixel patch identification and depth computation processes.

Having just described some of the various high-level features and benefits of the disclosed embodiments, attention will now be directed to FIGS. 1 through 7. These figures illustrate various architectures, methods, and supporting illustrations related to utilizing structured projection patterns in depth computation. The disclosure will then turn to FIG. 8, which presents an example computer system that may be used to facilitate the disclosed principles.

Simplified Depth Computation

In world-locked holograms/mixed-reality environments (aka world-stabilized imaging), a user may experience discomfort when his/her head movement is not matched to what is visually displayed. Therefore, it is desirable to provide the user 105 with as pleasant an experience as possible while the user 105 is wearing the HMD 110 by determining the user's position in relation to the various objects in the environment 100 (i.e. to perform depth detection and head tracking).

In FIG. 1, the environment 100 is shown as including a first object 115 and a second object 120. To obtain an accurate mapping of the real objects in the scene (aka mixed-reality environment), it is beneficial to know how far away these objects are from the user 105 at any given moment. By following the principles disclosed herein, significant advantages are realized because highly accurate depth determinations may be performed. By performing these depth determinations, the mixed-reality environment, which is created by the HMD 110, can accurately place virtual objects that interact with the real world. This results in a more life-like interaction of virtual and real world objects, and the user 105's experience will be significantly improved.

Figure 2:
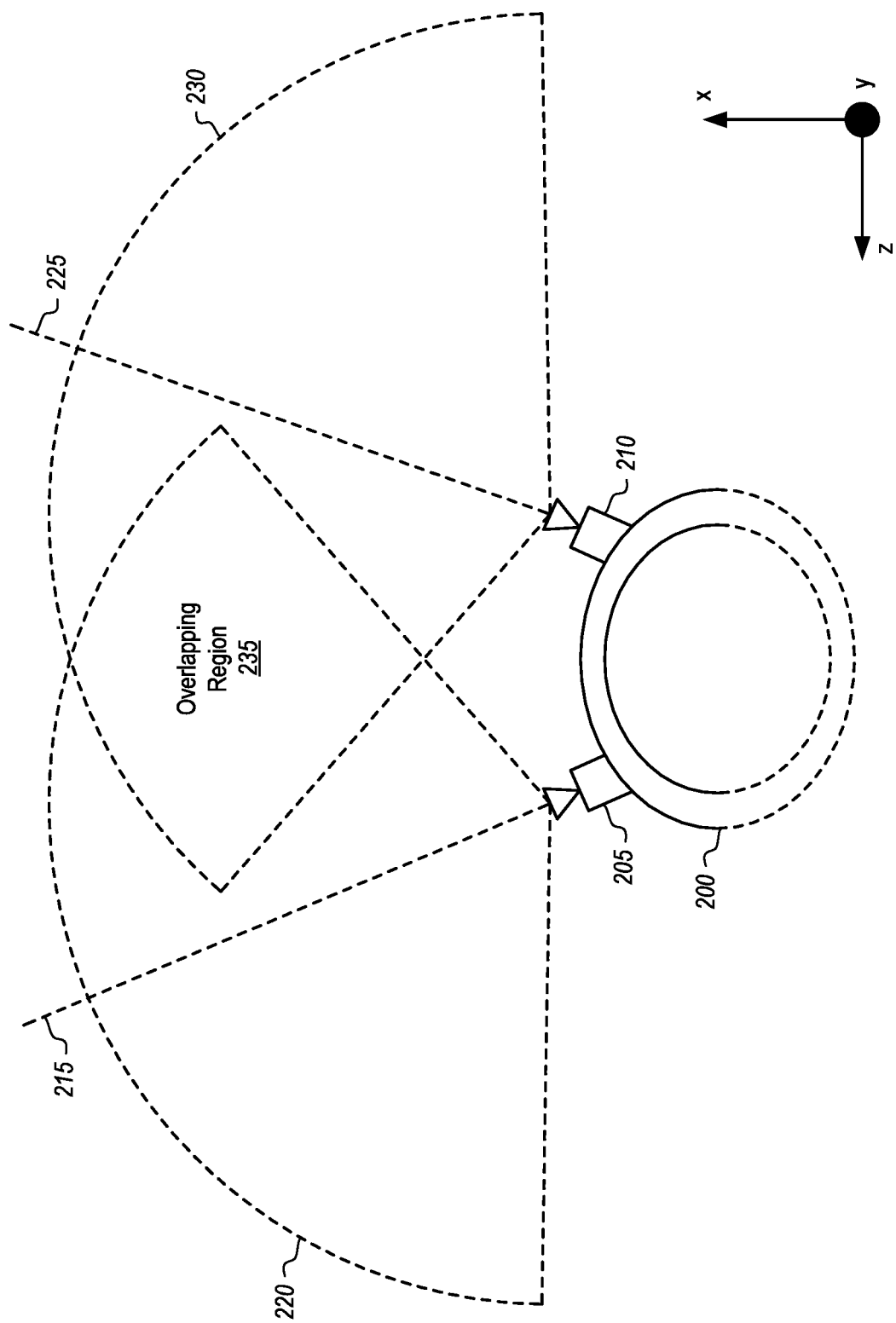
FIG. 2 illustrates a HMD that includes a stereo camera pair which can be used to perform depth detection using an overlapping field of view region existing between the two cameras' fields of view.

FIG. 2 shows a HMD 200 that is specially configured to perform advanced depth determinations in addition to rendering mixed-reality environments. For reference, this HMD 200 is one example implementation of the HMD 110 from FIG. 1. FIG. 2 is illustrated from a top perspective, looking down at the HMD 200, as indicated by the "x, y, z" direction legend.

As shown, HMD 200 includes a head-tracking stereo camera pair which includes at least two cameras, namely camera 205 and camera 210, both of which are mounted on the HMD 200. According to the disclosed embodiments, the head tracking stereo camera pair may be used for multiple different operations, including, but not limited to, capturing images for tracking the movements of the HMD 200, as well as capturing images for determining depth.

Although HMD 200 is shown as including only two cameras, the HMD 200 may actually include any number of cameras. For instance, the HMD 200 may include 3 cameras, 4 cameras or more than four cameras. As such, the HMD 200 is not limited only to two cameras.

Camera 205 is shown as including an optical axis 215. For reference, a camera's optical axis is an imaginary "line" that passes through the direct center of the camera's lens. As a practical example, an optical axis is akin to the point where the camera is being aimed. In addition to the optical axis 215, FIG. 2 also shows that camera 205 has a field of view 220. In some implementations, camera 205 includes a wide-angle lens such that the field of view 220 is also a wide-angle field of view. This wide-angle field of view may span a range anywhere from 45 degrees up to 180 degrees horizontally (in ultra-wide-angle cameras) and anywhere from 45 degrees up to 120 degrees vertically.

Camera 210 may be configured similarly to camera 205. For instance, camera 210 similarly includes an optical axis 225 and a field of view 230. By combining the fields of view of the two cameras, a very large spanning area (e.g., 170 degrees, 180 degrees, etc.) around the HMD may be captured.

These cameras may be configured in many different ways. For example, in some implementations, both of the cameras 205 and 210 are configured as global shutter cameras. In other implementations, however, the cameras 205 and 210 are configured as rolling shutter cameras. Of course, combinations of global shutter and rolling shutter cameras may also be used. As an example, the camera 205 may be a global shutter camera while the camera 210 may be a rolling shutter camera. In a preferred embodiment, a global shutter camera is used because rolling shutter cameras are more prone to motion blur. Of course, the HMD 200 may have many cameras, some of which are global shutter and some of which are rolling shutter.

In some implementations, the cameras 205 and 210 (and in particular the pixels of these cameras) may be configured to detect, or rather be sensitive to, different spectrums of light (e.g., visible light and infrared (IR) light). For reference, the visible light spectrum ranges anywhere from around 380 nanometers (nm) up to and including about 740 nm. More specifically, violet light ranges from 380 nm to 435 nm. Blue light ranges from 435 nm to 500 nm. Green light ranges from 500 nm to 520 nm. Yellow light ranges from 565 nm to 590 nm. Red light ranges from 625 nm to 740 nm.

In contrast to visible light, infrared (IR) light is invisible to a human's eye and has a wavelength that is longer than the wavelengths for visible light. The infrared light spectrum starts at the trailing edge of the red light spectrum, around 700 nm, and extends to at least 1 um in length.

With that said, cameras 205 and 210 (at a pixel level) are configured to detect both visible light and IR light. In some instances, one or more of the cameras 205 and 210 are monochromatic cameras (i.e. greyscale). In some instances one or more of the cameras 205 and 210 are chromatic cameras.

Of course, the cameras 205 and 210 may also be configured to detect only portions of the visible light spectrum and portions of the IR light spectrum. This may be achieved through the use of one or more optical bandpass filters in the lens. For brevity, the remaining disclosure will simply use the singular form of the term bandpass filter even though each camera may be configured with its own similarly configured or uniquely different bandpass filter.

The bandpass filter is configured, in some instances, to allow only a selected range of visible light to pass through and be detected by one or more corresponding camera(s) and while also allowing some or all IR light to also be detected by the same camera(s). Additionally, or alternatively, the bandpass filter may be configured to allow only a selected range of IR light to pass through and be detected by the one or more corresponding camera(s) while allowing some or all visible light to pass through and be detected by the same camera(s).

By way of example, the bandpass filter is configured in some embodiments to pass visible light having wavelengths between approximately 400 nm up to approximately 700 nm. In some embodiments, the bandpass filter is also specifically configured to pass IR light having wavelengths corresponding to the same wavelengths of IR light emitted by an IR laser mounted on the HMD 200 (to be discussed in more detail later). One example of the IR laser's wavelength may be approximately 850 nm. As such, the bandpass filter may pass IR light having wavelengths within a threshold value of the IR laser's wavelengths (e.g., within 10 nm, 20 nm, 30 nm, 40 nm, 50 nm, etc. of the emitted IR wavelength) while not passing other IR light wavelengths.

In view of the foregoing, it will be appreciated that one or both cameras 205 and 210 may include a bandpass filter that allows at least some visible light to pass through the bandpass filter (while potentially filtering out some visible light) and at least some IR light to pass through the bandpass filter (while potentially filtering out some IR light). Likewise, in some implementations, camera 205 and/or camera 210 may also omit any IR light filter.

FIG. 2 also shows how the cameras 205 and 210 may be positioned in relation to each other on the HMD 200. For example, at least a part of the field of view 220 of camera 205 is shown as overlapping at least a part of the field of view 230 of camera 210 thus forming the overlapping region 235 (aka an "overlapping field of view region"). This overlapping region 235 is beneficial for a number of reasons, which will be discussed later.

In some configurations, the cameras may be horizontally offset (e.g., offset relative to a horizontal alignment of the HMD 200 in the y-direction plane). For instance, camera 205 may be pointed slightly downward or upward in the y-direction while camera 210 may be aligned with the horizontal plane (e.g., y-direction). In this manner, the camera 205 may have a y-angle offset in relation to the horizontal alignment of the HMD 200. Relatedly, the camera 210 may be pointed slightly downward or upward in the y-direction relative to camera 205, while camera 205 is aligned with the y-direction horizontal plane. Of course, combinations of the above are also available. For instance, camera 205 may be pointed slightly downward relative to the horizontal plane and camera 210 may be pointed slightly upward relative to the horizontal plane, and vice versa. Alternatively, cameras 205 and 210 are horizontally aligned, such that they do not have any y-angle offset and such that they are pointed directionally level in the y-direction.

Additionally, or alternatively, to the above horizontal alignments/offsets, cameras 205 and 210 may also be aligned/offset in other directions. For instance, FIG. 2 shows that the optical axis 215 of camera 205 is angled (i.e. non-parallel) in relation to the optical axis 225 of camera 210 in the x-direction. Such a configuration is sometimes beneficial because it allows the cameras 205 and 210 to capture a larger area of the surrounding environment, thus providing more reference area when performing movement detection (e.g., head tracking). This angle offset may be any selected angle. Example angles include, but are not limited to 5 degrees, 10, 15, 20, 25, 30, 35, 40, 45, 50, 55, 60, 65, 70, 75, 80, 85 degrees, and so on.

Although FIG. 2 and the remaining figures show the cameras 205 and 210 angled in relation to one another, the embodiments should not be limited to such a configuration. In fact, in some instances, the optical axes 215 and 225 are aligned in parallel with one another in the x direction. In any event, and regardless of which orientation is used, the disclosed embodiments advantageously create overlapping region 235 with the fields of view 220 and 230.

Yet another configuration is available for the cameras 205 and 210. To illustrate, the vertical positions of the cameras 205 and 210 (i.e. the relative height of the cameras along the y-direction on the HMD 200) may also vary. As an example, camera 205 may be positioned below camera 210 on the HMD 200. Alternatively, camera 210 may be positioned below camera 205 on the HMD 200. Otherwise, the cameras 205 and 210 are mounted at the same relative height/vertical position on the HMD 200. Accordingly, from this disclosure, it is clear that the positions and orientations of the cameras 205 and 210 may vary widely.

Now that the configurations for the cameras 205 and 210 have been introduced, the disclosure will turn to how these cameras 205 and 210 may operate. Recall, the stereo camera system/pair (i.e. cameras 205 and 210) are configured to detect light for performing movement detection (e.g., head tracking, hand tracking, object tracking, etc.), as well as depth detection. With regard to head tracking, the stereo camera pair actually constitutes an "inside-out" head tracking system because the stereo camera pair is mounted on the HMD 200.

An "inside-out" head tracking system tracks the position of a HMD (e.g., HMD 200) by monitoring the HMD's position in relation to its surrounding environment. This is accomplished through the use of tracking cameras (e.g., cameras 205 and 210) that are mounted on the HMD itself and that are pointed away from the HMD. In contrast, an "outside-in" tracking system uses cameras or external light illuminators that are mounted in the environment and that are pointed toward the HMD. In this manner, inside-out head tracking systems are distinguished from outside-in head tracking systems.

As shown, cameras 205 and 210 are mounted on the HMD 200 (i.e. the object being tracked) and may be (but are not required to be) slightly oriented away from each other (as shown by the angled orientation of the optical axes 215 and 225). Stated differently, the optical axis 215 is angled in relation to the optical axis 225.

To capture as much of the surrounding environment as possible, camera 205 and camera 210 may be positioned apart, at a preselected distance from each other, and may be angled away from each other. This preselected distance is referred to as a "baseline," and it may be any distance. Commonly, however, the baseline will range anywhere between at least 4 centimeters (cm) up to and including 16 cm (e.g., 4.0 cm, 4.1 cm, 4.2 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, 10.5 cm, 11.0 cm, 11.5, cm, 12.0 cm, 12.5 cm, 13.0 cm, 13.5 cm, 14.0 cm, 14.5 cm, 15.0 cm, 15.5 cm, 16.0 cm, or more than 16.0 cm or less than 4.0 cm). Often, the baseline is at least 10 centimeters. Sometimes, the baseline is chosen to match the most common interpupil distance for humans, which is typically between 5.8 cm and 7.2 cm. In general, a wider baseline allows for accurate depth from stereo for an increased distance over narrower baseline designs. Other factors that may influence the accuracy of the camera system are the cameras' fields of view and their image resolution.

With the foregoing configuration, the stereo camera system is enabled to capture a large area of the surrounding environment, thus enabling the HMD 200 to interpolate its own position in relation to that environment. In addition to performing head tracking, the HMD 200 (and specifically the stereo camera pair along with the stereo camera pair's logical components) may be re-purposed, or rather multipurposed, to also perform an improved form of depth detection. By re-purposing existing hardware components, the embodiments significantly reduce the cost for performing depth detection, especially when compared to time-of-flight depth detection systems.

As an initial matter, it is noted that humans are able to perceive "depth" because humans have a pair of eyes that work in tandem. When both eyes are focused on an object, signals from the eyes are transmitted to the brain. The brain is then able to interpolate depth using any disparity existing between the information captured from the two eyes.

Similar to how a human's eyes "focus" on an object when determining depth, the HMD 200 also obtains "focused" digital image content to determine depth. Here, the "focused" digital image content is obtained from camera images that include content corresponding to the overlapping region 235 (i.e. camera 205's image and camera 210's image, both of which include digital content corresponding to the overlapping region 235). In this manner, the cameras 205 and 210 obtain separate images, but these images still have at least some similar content.

Here, an example will be helpful. Suppose a table was located in the HMD 200's environment and that the HMD 200 was positioned so that the table was located within the overlapping region 235. In this scenario, cameras 205 and 210 are each able to obtain a digital image that includes digital content corresponding to the table. Consequently, at least some of the pixels in the image obtained by camera 205 will correspond to at least some of the pixels in the image obtained by camera 210. Specifically, these "corresponding pixels" (i.e. the pixels in the one image that correspond to the pixels in the other image) are associated with the table.

Once these digital images are obtained, then the HMD 200 performs certain transformations (also called "re-projections") on those digital images. These transformations correct for lens distortion and other camera artifacts. Furthermore, the stereo images are re-projected onto a virtual stereo rig where both image planes lie inside a plane that is parallel to the stereo cameras' baseline. After re-projection, corresponding pixels are guaranteed to lie on the same horizontal scanline in left and right images. As a result, two "re-projected" images are formed, one for the image that was obtained by the camera 205 and one for the image that was obtained by the camera 210. Any pixels that are similar/correspond between the two re-projected images now lie on the same horizontal plain.

After the re-projected images are created, the HMD 200 measures any pixel disparity that exists between each of the corresponding pixels in the two images. Because the HMD 200 understands that the corresponding pixels in the two re-projected images are now in the same horizontal plain, the HMD 200 identifies that the disparity between these corresponding pixels corresponds (i.e. is proportional) with a depth measurement. Using this disparity, the HMD 200 assigns a depth value to each pixel, thus generating a depth map for any objects located in the overlapping region 235. Accordingly, the HMD 200, through the use of its multipurposed head-tracking stereo camera pair, is able to perform both movement detection as well as depth detection.

The remaining portion of this disclosure uses many examples of cameras and head tracking stereo camera pairs (or simply stereo camera pairs). Unless stated otherwise, these cameras may be configured with any of the positional/alignment configurations discussed above.

In some instances, camera system includes one or more cameras that are configured to sense visible light (and not IR light), in other instances, the camera system includes one or more cameras that are configured to sense IR light (but not visible light). In yet other instances, the camera system includes one or more cameras configured to sense both visible and IR light. Similarly, the light illuminator described herein may be configured with one or more illumination components that emit (individually or collectively) only visible light, only IR light, or a combination of both IR and visible light.

Therefore, regardless of whether the system is performing head tracking or depth detection, any of the cameras and illuminators mentioned above, operating in any of the configurations mentioned above, may be used.

Figure 3:
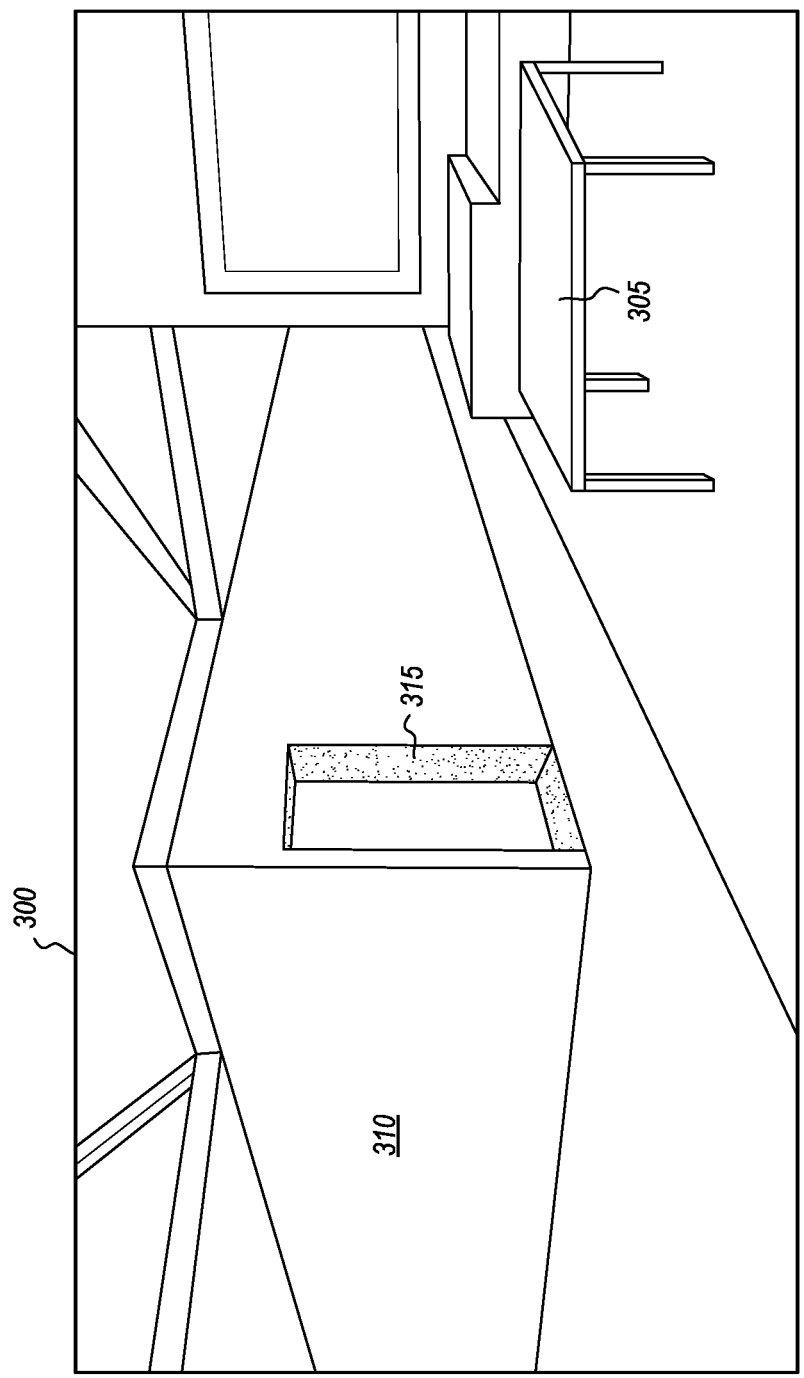
FIG. 3 shows an example environment in which the HMD may be used, and this example environment includes some objects that have smooth surfaces.

With that understanding, attention will now be directed to FIG. 3. In this illustration, an example environment 300 is provided, which may be presented to a user (e.g., user 105 from FIG. 1) who is using a HMD (e.g., HMD 110 from FIG. 1 or HMD 200 from FIG. 2) to visualize a mixed-reality environment.

Environment 300 includes a number of different features and objects. For example, environment 300 includes a textureless/smooth table top 305, a textureless/smooth wall 310, and a textured door frame 315, just to name a few. Of course, this is just one example of what an environment may look like, and thus should not be considered limiting or otherwise binding.

One problem that conventional depth perception systems have faced is determining depth for "textureless/smooth" objects (e.g., the textureless/smooth table top 305 and the textureless/smooth wall 310). For textured surfaces, like the textured door frame 315, traditional depth detection systems are usually able to capture enough details to perform the stereo matching between the left and right cameras to adequately gauge the depth of those textured objects. Unfortunately, however, traditional depth detection systems are very inadequate in determining the depth of textureless/smooth objects. In particular, traditional depth detection systems cannot collect enough information to adequately distinguish one part of the textureless/smooth object from another part, which may be further away.

For instance, if a user were to stand near the textureless/smooth table top 305, portions of the textureless/smooth wall 310 will be significantly closer than other portions of the textureless/smooth wall 310. However, traditional systems are unable to account for this change in depth because of a lack of texture on the surfaces and, hence a lack of reflected light that is used to determine the depth. As a result, traditional systems will often generate a false or otherwise misleading depth map for textureless/smooth objects like textureless/smooth wall 310. If any virtual content is dependent on that false depth map, then clearly the mixed-reality environment will be skewed and thus the user's experience will be hampered.

To address the above problems, some of the disclosed embodiments beneficially project, or rather add, texture to the environment. In some implementations, this texture is in the form of an infrared (IR) dot-pattern illumination. Because the HMD's stereo camera pair (e.g., camera 205 and 210 from FIG. 2) is sensitive to both visible and infrared (IR) light, the stereo camera pair is able to detect the added texture and compute proper depth for any kind of object, even a textureless/smooth object. The HMD is thereby provided a picture with structured light, thus improving depth quality determinations.

Figure 4:
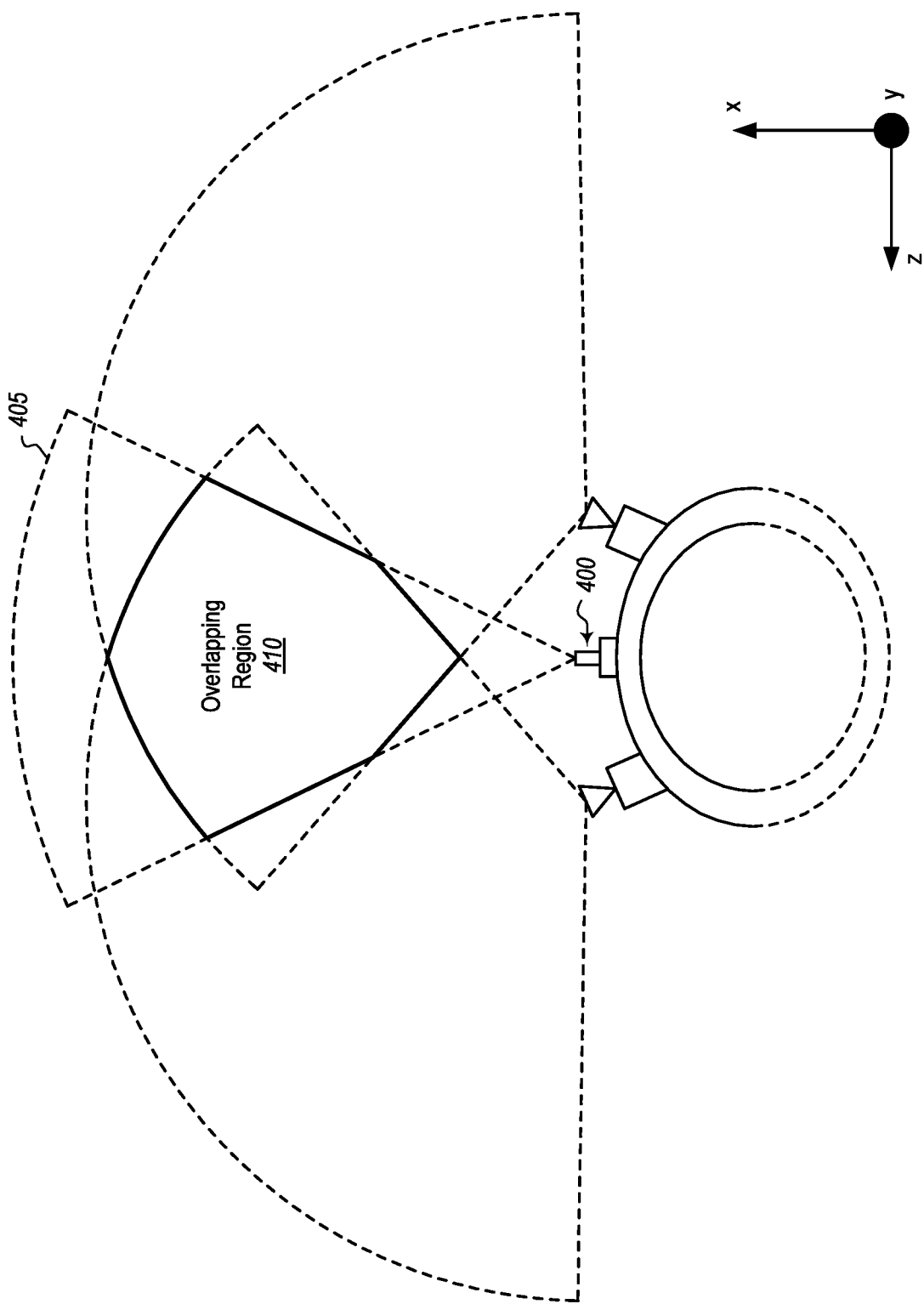
FIG. 4 demonstrates a HMD which includes, in addition to a stereo camera pair, an infrared (IR) dot pattern illuminator configured to project an IR dot pattern on at least a portion of the overlapping field of view region existing between the two cameras' fields of view.

Attention is now directed to FIG. 4. In this illustration, an IR dot pattern illuminator 400 projects/disperses IR light as an IR dot pattern illumination 405. This IR dot pattern illumination 405 may be projected to any predetermined illumination area within the HMD surrounding environment (e.g., any area in the environment 300 from FIG. 3). As shown, the IR dot pattern illuminator 400 is mounted on a HMD. Because the elements of the HMD in FIG. 4 are very similar to the elements shown in FIG. 2 (e.g., the HMD 200, the cameras 205 and 210, and the fields of view 220 and 230), the common elements have not been relabeled.

Although, FIG. 4 only shows a single IR dot pattern illuminator 400 being used to project the IR dot pattern illumination 405, it will be appreciated that the IR dot pattern illuminator may actually comprise two or more IR dot pattern illuminators, (not shown), and which are mounted on the HMD. It will also be appreciated that the IR dot pattern illuminator 400 may also include any combination of IR light emitting diode (LED), LED array, IR laser diode, incandescent discharge illuminator, vertical-cavity surface-emitting laser (VCSEL) and/or plasma discharge illuminator.

The IR dot-pattern illumination 405 may be generated in various ways. For instance, in a preferred embodiment, the IR dot-pattern illumination 405 is generated using a diffraction limited laser beam, a collimating optic, and a dot pattern generator (e.g., diffractive optical element (DOE)). As such, the IR dot-pattern illuminator 400 may also include a collimating optic and a DOE to provide the desired projection/dispersion of the IR dot-pattern illumination 405. When an IR laser shoots a diffraction limited laser beam of IR light into the DOE, then the DOE disperses the IR light in such a manner so as to project the pre-configured dot pattern illumination. Other IR LED, incandescent discharge illuminator, VCSEL, plasma discharge illuminator, etc., may be used with more traditional imaging and re-projection techniques as well.

In an alternative embodiment, an etched lens may also be placed over top of an IR optical source/illuminator. In a first example, individual dots may be etched onto the lens to create the dot pattern. When the dot pattern illuminator 400's IR laser emits a beam of IR light through this type of lens, the IR light unimpededly passes through the lens in the areas that were not etched. However, for the dot areas that were etched, the IR light may be impeded in accordance with the etched pattern, thus projecting a dot pattern into the surrounding environment.

In a second example, large swatches may be etched onto the lens while avoiding small "dot" areas that correspond to the dot pattern. When the IR laser emits a beam of IR light through this type of lens, only IR light that passes through the small unetched "dot" areas will pass unimpededly, thus projecting a dot pattern into the surrounding environment. Any other technique for generating a dot pattern may also be used (e.g., instead of etching the lens, a dot pattern covering may be placed on the lens). Additionally, any other DOE may be used to disperse IR light in accordance with a pre-configured dot pattern. Regardless of its implementation, a beam of IR light is dispersed according to a predetermined dot pattern.

Here, the IR dot pattern illuminator 400 is oriented in such a manner as to emit the IR dot pattern illumination 405 to at least partially overlap with the overlapping field of view region 410 of the HMD camera system. In some implementations, the IR dot pattern illumination 405 overlaps a majority and/or all of the overlapping field of view region 410, while in other implementations, the IR dot pattern illumination 405 overlaps only a minority portion of or other selected percentage (e.g., 30%, 35%, 40%, 45%, 50%, 55%, 60%, 70%, 80%, 90%, etc.) of the overlapping field of view region 410.

As described herein, the IR dot pattern illumination 405 is projected into the surrounding environment of a HMD in order to project, or rather add, "texture" to object surfaces in the surrounding environment. The overlap over the IR dot pattern illumination 405 with the field of view region 410 enables both of the HMD's cameras to detect at least a part of the IR dot pattern illumination 405 being reflected off of objects in the overlapping field of view region 410. In this manner, the cameras are able to obtain digital images that include digital content corresponding to the texture (i.e. the "obtained" texture is actually reflected IR light generated as a result of the IR dot pattern illumination 405 reflecting off of surfaces in the environment). Using the left and right camera images with improved details, the stereo matching is improved, allowing the depth detection system to compute pixel disparity, thus determining depth of objects (even textureless/smooth objects) in the overlapping field of view region 410. In some instances, because the stereo cameras 205 and 210 are sensitive to both IR light and visible light, the digital images obtained by the cameras include IR dot pattern illumination reflections (for smooth objects) in addition to readily identifiable features (for textured objects) which do not require IR illumination for depth calculation. Such functionality is shown and described in more detail below.

FIG. 5 illustrates some particular characteristics of the IR dot pattern illumination 505 projected by the IR dot pattern illuminator 500. The particular dot pattern shown is illustrative and non-limiting. Other dot patterns which share some of the particular dot pattern characteristics mentioned hereinbelow are also within the scope of this disclosure.

In order to determine depth through stereo matching, after the HMD obtains a pair of re-projected images (e.g., from the images captured by cameras 205 and 210 of the HMD 200, respectively), the HMD must determine the disparity between each of the similar pixels in the two re-projected images to generate a depth map. Because the re-projected images are aligned in the same horizontal plane, each re-projected image includes a plurality of horizontal scanlines, and for each scanline there exists a corresponding horizontal scanline in the other re-projected image. With this arrangement established, disparity may be determined by centering a first pixel patch of a predetermined size (e.g., a seven-by-seven pixel square patch) around a pixel in a scanline of one image, and then determining a second pixel patch of the same size on the corresponding scanline of the other image that is similar to the first pixel patch (e.g., by machine learning). The difference in relative horizontal positioning of the two pixel patches along their respective scanlines may then be easily determined, resulting in the disparity between the pixels around which the pixel patches are centered. The depth is then easily calculated from the disparity, and this method may be repeated for each pixel in an image to generate a depth map.

It should therefore be noted that in order to perform stereo matching, it is imperative that the pattern analyzed by the system is unambiguous in the horizontal direction. Put differently, for every pixel/pixel patch q, there is no other pixel/pixel patch q' on the same horizontal scanline that shares the same/similar characteristics that would cause pixel/pixel patch q to be identified as being the same as pixel/pixel patch q'. Without this condition met, multiple similar pixel patches may be found by the system on the same scanline(s), and which results in a poor stereo matching result.

As illustrated, the IR dot pattern illumination 505 comprises a plurality of sub-patterns 509 which are replicated and adjacently arranged throughout the dot pattern illumination 505. The replicated nature of the illustrated dot pattern 509 within IR dot pattern illumination 505 contrasts with traditional random dot patterns. As will be described in more detail below, the disclosed replicated dot sub-patterns 509 can be utilized in stereo matching processes, despite the foregoing horizontal ambiguity condition and by utilizing a maximum disparity parameter.

Attention is now directed towards FIG. 6, which illustrates a sub-pattern 609 of the IR Dot pattern Illumination 505. Initially, the height of the illustrated sub-pattern may correspond to the height of the pixel patch to be used in the stereo matching process (e.g., seven pixels), although other heights may also be used for the sub-pattern. For example, a pixel patch may have a height of five pixels while the height of the sub-pattern may be nine pixels, or vice versa. The pixel patches 615 and 625 correspond to a plurality of pixels centered around a selected pixel in each patch, respectively, regardless of the size of the pixel patches. Notably, the sub-pattern 609 omits any two pixel patches that are identical or substantially similar as to be considered the same by the scanning system within the same sub-pattern 609.

It is also notable that the sub-pattern 609 may be replicated in the vertical direction without violating the previously mentioned horizontal ambiguity condition because the vertical direction is perpendicular to the scan direction (the horizontal direction). Accordingly, replicating the sub-pattern vertically will not result in ambiguities that lead to poor stereo matching results.

In some embodiments, to ameliorate the aforementioned horizontal ambiguity condition and therefore allow replication of the sub-pattern 609 in the horizontal direction, a maximum disparity parameter is established. The maximum disparity parameter corresponds to a search range, or, put differently, a maximum distance over which the HMD will search in a scanline for a second pixel patch that is similar to a first pixel patch of a corresponding scanline. When a maximum disparity parameter is established, even if two pixels/pixel patches (e.g., q and q') are identified as being substantially the same and coexisting in a same horizontal scanline, as long as these similar pixels/patches are not within a threshold distance of each other that is smaller than the maximum disparity, stereo matching results will not be negatively affected.

Therefore, according to some disclosed embodiments, any particular pixel sub-pattern can be replicated in a same horizontal scanline, thereby facilitating pattern recognition and improved efficiencies in depth detection, as long as the modified horizontal ambiguity condition is met by ensuring that the threshold distance between the replicated pixels/patches is greater than the maximum disparity. Even more particularly, for every pixel/pixel patch q, there are no pixel/pixel patch q' with $$|q_x - q'_x| \leq \frac{d}{2}$$

in the same scanline which is the same/identical to q, where d denotes the maximum disparity parameter, and wherein $q_x$ and $q_x'$ denote the horizontal positions of q and q', respectively.

In the sub-pattern 609 illustrated in FIG. 6, a maximum disparity of seventy pixels is used, which corresponds to the width of the sub-pattern. It will be appreciated, however, that the sub-pattern may have any width that exceeds the predefined maximum disparity parameter without resulting in pixel patch ambiguities. The maximum disparity parameter may be selected based on a number of criteria, including, but not limited to, the field of view of the stereo cameras, the size of the overlap region between the stereo cameras, the relative positioning of the stereo cameras, and/or computational resources available.

An appropriate sub-pattern to be replicated and used for the overall IR dot pattern illumination can be generated in a variety of ways. For example, a sub-pattern with a desired height and width that follows the modified horizontal ambiguity condition may be designed by manual dot placement. Another example method involves iterative generation. By way of example, after establishing a desired maximum disparity, fill rate (i.e., the percent of the area to be illuminated, e.g., 20%), and sub-pattern height, a computing system may generate a random dot pattern and utilize a cost function to measure the ambiguity of the pattern. Subsequently the computing system may reduce the occurrence of pixels/patches that violate the modified horizontal ambiguity condition by iteratively replacing dots in the dot pattern with other dots positioned in random locations, measuring whether the occurrence of duplicate/violating pixel patches within the disparity threshold are reduced and continuing to iterate as long as improvements are made in reducing the occurrence of duplicate/violating pixel patches within the disparity threshold (e.g., breaking the iterative loop when duplicates are not identified within the disparity threshold after a certain number of iterations).

Utilizing dot patterns comprising replicated sub-patterns in stereo matching to determine depth of objects with flat surfaces provides several technical benefits. Initially, manufacturing costs for IR dot pattern illuminators may, in some instances, be reduced by requiring a small replicated sub-pattern. For example, in lens etching and/or DOE fabrication processes, a replicated dot pattern is less complicated to etch (because of its replicated nature) than a random dot pattern that will span the entire projection area of the IR dot pattern illuminator.

Additionally, in certain instances, a replicated dot pattern may reduce the computational burden associated with performing stereo matching. By way of example, in the case of a random pattern including randomly generated pixels across each scanline, there are l×h unique pixel patches which a computing system must learn in order to perform stereo matching by machine learning, where l corresponds to the pixel length of the entire random dot pattern and h corresponds to its pixel height. In contrast, where a dot pattern of the present disclosure is utilized, for example, there are only d×p unique pixel patches which a computing system must learn in order to perform stereo matching by machine learning, wherein d corresponds to the pixel length of the sub-pattern (which in some instances corresponds to the maximum disparity parameter described hereinabove), and wherein p denotes the pixel height of the sub-pattern (which may correspond to the height of the pixel patch used in the matching processes). Because d<l and p<<h, d×p results in far fewer unique pixel patches than l×h. In this manner, it is possible to reduce the quantity of pixel patches a computing system must learn when utilizing machine learning for stereo matching.

This aspect of the technical benefits may be illustrated in even more detail by a non-limiting example. Given an IR dot pattern illumination including a sub-pattern with d=80 pixels and p=7 pixels replicated horizontally three times and vertically ten times, there would be 80×7=560 unique pixel patches. A traditional random dot pattern of the same size, on the other hand, would require the computing system to learn (80×3)(7×10)=16,800 unique pixel patches to perform stereo matching with machine learning. Accordingly, the replicated IR dot pattern illumination approach of the present disclosure is capable of providing substantial benefits, especially in low compute or low bandwidth scenarios.

While the disclosure has used the phrase "dot pattern," it will be appreciated that the term "dot" does not limit the illuminations to a circular shape. In fact, any shape of dot may be projected in the predetermined dot pattern. For example, the dot pattern may include a pattern of circles, triangles, squares, rectangles, vertical lines and/or any other polygon or oval shaped dot(s).

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

As shown in FIG. 7, a flowchart 700 is provided with various acts associated with methods for utilizing a dot pattern of the present disclosure to perform depth detection with a camera system. The first illustrated act is an act for projecting an IR dot pattern into a surrounding environment having one or more objects within a field of view of a camera system and that is reflected off of the one or more objects as IR dot pattern light, wherein the dot pattern comprises a replicated sub-pattern that is replicated in at least one direction (act 701). For reference, this act may be performed by the IR dot pattern illuminator 400 from FIG. 4.

Subsequently, a first image of the reflected IR dot pattern light is obtained with a first camera and a second image is obtained with a second camera of the stereo camera system (act 703). This act is performed, for example, by cameras 205 and 210 described in FIGS. 2 and 4. Notably, the reflected IR light that is captured in the first and second images is generated as a result of at least a portion of the IR dot pattern illumination reflecting off of the surfaces in the environment (e.g., the smooth table top 305 of FIG. 3). The images that are captured also include visible light data that is usable for tracking, as described above.

In some instances, the first and second images are captured concurrently, wherein the first image includes digital content corresponding to a first part of the IR dot pattern illumination and the second image includes digital content corresponding to a second part of the IR dot pattern illumination. However, the first and second images also include at least some digital content corresponding to at least some of the same IR dot pattern illumination being reflected in the surrounding environment.

During image processing for the depth detection, the first image and the second image are re-projected in such a manner as to generate first and second rectified images having corresponding parallel scanlines (act 705). This is accomplished, in some instances, by the HMD processors executing stored computer-executable instructions. Because the re-projected images include corresponding parallel scanlines, the HMD is then enabled to determine/generate a depth map of the surrounding environment based on the captured images and which may include smooth/textureless surfaces.

Notably, HMD is able to determine a depth for objects in the environment, even when those objects have smooth/textureless surfaces because the IR dot pattern adds texture to the objects. By determining the depth for objects in this manner (i.e. stereo vision), it is not necessary to utilize additional hardware/components to perform time-of-flight computations. This can save costs and reduce the overall weight and energy requirements of the HMDs by eliminating the need for time-of-flight systems that are relatively expensive and require additional hardware. In contrast, the current embodiments re-purpose many existing components so that they can perform new or additional functionalities, thus saving significant costs and thereby reducing computational and power burdens on the HMDs.

The next act recited in the flowchart 700 of FIG. 7 is an act of using image patches in the re-projected images to determine a depth of the one or more objects (act 707). This act may be performed by the HMD processor(s) executing stored computer-executable instructions on the HMD. In some instances, the HMD also utilizes machine learning to facilitate pattern recognition.

In some instances, the depth determination is made (act 707) by the HMD centering a first pixel patch of a predetermined size (e.g., a seven-by-seven pixel square patch) around a pixel in a scanline of the first re-projected image. The HMD then determines a second pixel patch of the same size on the corresponding scanline of the second re-projected image that is similar (e.g., has similar dot/light arrangements, intensities and/or other configurations) to the first pixel patch and calculates the difference in relative horizontal positioning of the two pixel patches along their respective scanlines, resulting in the disparity between the pixels around which the pixel patches are centered. The HMD finally calculates the depth, which is inversely proportional to disparity. This process is repeated, in some instances, for each pixel in the rectified images to generate the resulting depth map.

By obtaining images of the reflected IR light using both a left camera and a right camera (which are both sensitive to IR and visible light), the HMD is able to measure the pixel disparity present between common pixels in the two images, for smooth/textureless surfaces in addition to just textured surfaces.

Example Computer System

Figure 8:
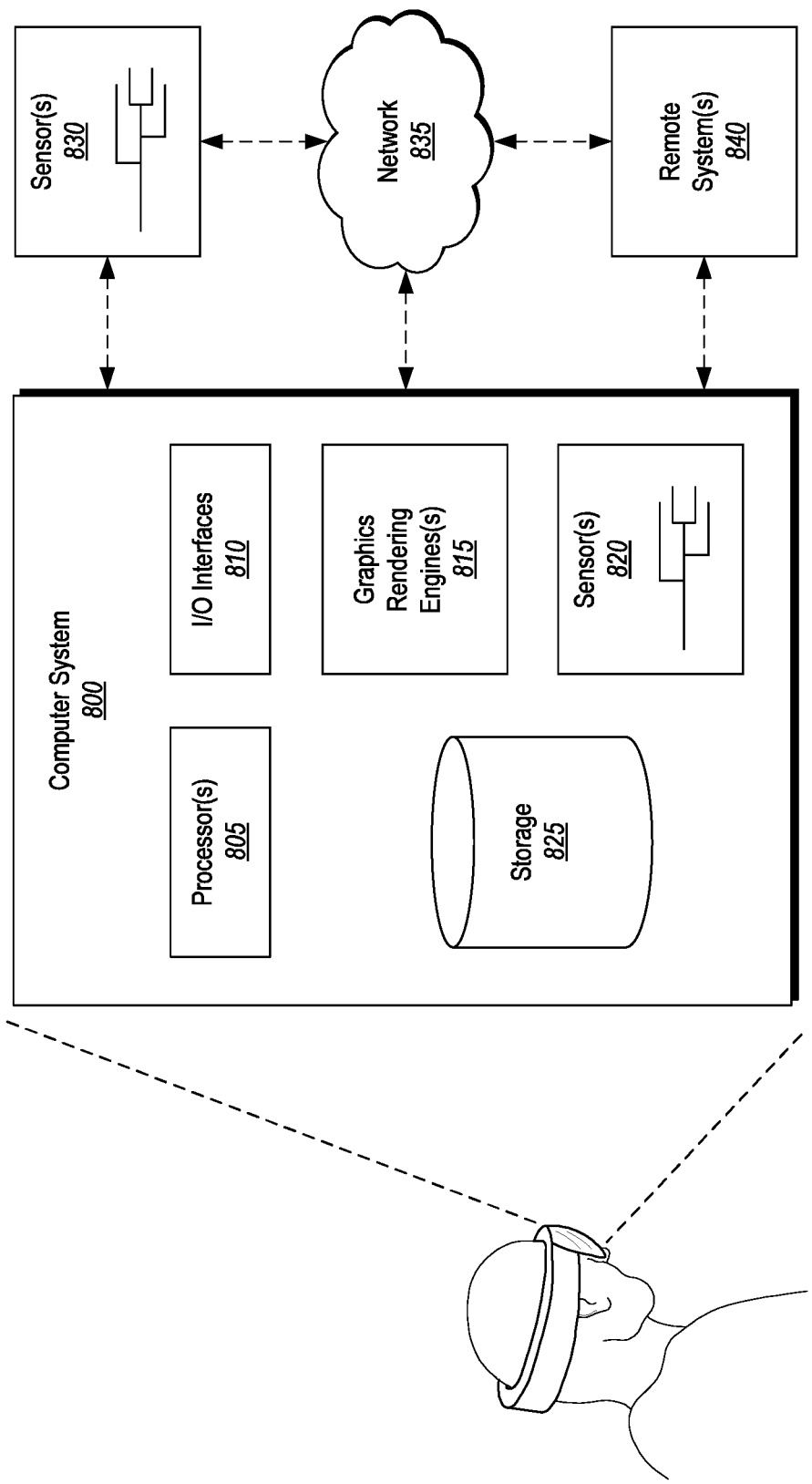
FIG. 8 portrays an example computer system that may be used to perform embodiments disclosed herein.

Having just described the various features and functionalities of some of the disclosed embodiments, the focus will now be directed to FIG. 8 which illustrates an example computer system 800 that may be used to facilitate the operations described herein. In particular, this computer system 800 may be in the form of the HMDs that were described earlier.

In fact, the computer system 800 may take various different forms. For example, in FIG. 8, the computer system 800 is embodied as a HMD. Although the computer system 800 may be embodied as a HMD, the computer system 800 may also be a distributed system that includes one or more connected computing components/devices that are in communication with the HMD. Accordingly, the computer system 800 may be embodied in any form and is not limited strictly to the depiction illustrated in FIG. 8. By way of example, the computer system 800 may include a desktop computer, a laptop, a tablet, a mobile phone, server, data center and/or any other computer system.

In its most basic configuration, the computer system 800 includes various different components. For example, FIG. 8 shows that computer system 800 includes at least one hardware processing unit 805 (aka a "processor"), input/output (I/O) interfaces 810, graphics rendering engines 815, one or more sensors 820, and storage 825. More detail on the hardware processing unit 805 will be presented momentarily.

The storage 825 may be physical system memory, which may be volatile, non-volatile, or some combination of the two. The term "memory" may also be used herein to refer to non-volatile mass storage such as physical storage media. If the computer system 800 is distributed, the processing, memory, and/or storage capability may be distributed as well. As used herein, the term "executable module," "executable component," or even "component" can refer to software objects, routines, or methods that may be executed on the computer system 800. The different components, modules, engines, and services described herein may be implemented as objects or processors that execute on the computer system 800 (e.g. as separate threads).

The disclosed embodiments may comprise or utilize a special-purpose or general-purpose computer including computer hardware, such as, for example, one or more processors (such the hardware processing unit 805) and system memory (such as storage 825), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 800 may also be connected (via a wired or wireless connection) to external sensors 830 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. Further, the computer system 800 may also be connected through one or more wired or wireless networks 835 to remote systems(s) 840 that are configured to perform any of the processing described with regard to computer system 800.

During use, a user of the computer system 800 is able to perceive information (e.g., a mixed-reality environment) through a display screen that is included among the I/O interface(s) 810 and that is visible to the user. The I/O interface(s) 810 and sensors 820/830 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 815 is configured, with the hardware processing unit 805, to render one or more virtual objects within the scene. As a result, the virtual objects accurately move in response to a movement of the user and/or in response to user input as the user interacts within the virtual scene.

A "network," like the network 835 shown in FIG. 8, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 800 will include one or more communication channels that are used to communicate with the network 835. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components (e.g., the hardware processing unit 805). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The disclosed embodiments provide various advantages over traditional HMD systems. Some of these advantages include providing a more robust and accurate depth determination for mixed-reality environments, particularly low light environments. Additionally, some of these advantages include the ability to track movement (e.g., head movement, hand movement, etc.) in any kind of environment, even low light environments. Furthermore, by repurposing existing hardware components, such as the head tracking cameras to additionally perform depth detection, the disclosed embodiments can reduce/simplify the costs, power consumption and form factor of the HMD systems.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system configured for utilizing a dot pattern to perform depth detection, the system comprising:
    one or more processors;
    a camera system comprising at least one camera having a corresponding field of view;
    a light illuminator comprising a light source and a dot pattern generator that emits the dot pattern generated by the light source, the light illuminator being configured to project a dot pattern on one or more objects in a region within the field of view, the dot pattern comprising a replicated sub-pattern having a predefined height and width, the replicated sub-pattern comprising a plurality of dots arranged such that the replicated sub-pattern omits any two patches that include an identical arrangement of dots, the any two patches having a height that corresponds with the predefined height of the replicated sub-pattern and including at least one dot of the plurality of dots, the replicated sub-pattern being replicated in at least one of a first direction or a second direction that is perpendicular to the first direction, and such that the dot pattern comprises a plurality of replicated sub-patterns that are adjacently positioned when projected by the light illuminator within the field of view; and
    one or more computer-readable media having stored computer-executable instructions that are operable, when executed by the one or more processors, to cause the computer system to perform the following:
        project the dot pattern with the light illuminator;
        obtain a first image of the dot pattern, which is reflected in the region from the projection of the dot pattern, with the camera system; and
        perform depth detection based on the dot pattern.

2. The system of claim 1, wherein the dot pattern comprises the replicated sub-pattern replicated in both the first direction and the second direction.

3. The system of claim 1, wherein the camera system includes a first camera that obtains the first image of the dot pattern and a second camera that obtains a second image of the dot pattern and wherein the predefined width of the sub-pattern corresponds to a predetermined maximum disparity search distance over which the system will search for matching pixel patches.

4. The system of claim 3, wherein the computer-executable instructions are further operable to cause the system to perform depth detection with stereo matching between the first image and the second image.

5. The system of claim 3, wherein the computer-executable instructions are further operable to cause the system to determine a first pixel patch which is obtained by the first camera matches a second pixel patch which is obtained by the second camera.

6. The system of claim 5, wherein the determining the first pixel patch matches the second pixel patch is based on determining a similarity of intensity of light detected in the first image patch and the second image patch.

7. The system of claim 6, wherein the first and second image patches have illuminated pixels that span an entire width of overlapping regions of a field of view of the first camera and a field of view of the second camera.

8. The system of claim 3, wherein the computer-executable instructions are further operable to cause the system to:
reproject the first and second images to generate a first rectified image and a second rectified image, respectively, wherein the first rectified image includes a first plurality of scanlines and the second rectified image includes a corresponding second plurality of scanlines, the first and second pluralities of scanlines extending parallel to each other; and
search for a match between a first pixel patch in the first plurality of scanlines and a second pixel patch in the second plurality of scanlines.

9. The system of claim 1, wherein the light illuminator comprises an infrared (IR) light illuminator and wherein the at least one camera comprises an IR light sensing camera.

10. The system of claim 1, wherein the light illuminator comprises a visible light illuminator and wherein the at least one camera comprises a visible light sensing camera.

11. The system of claim 1, wherein the light illuminator comprises an infrared (IR) light illuminator and wherein the at least one camera comprises at least one camera configured for sensing IR light and visible light.

12. The system of claim 11, wherein the light illuminator comprises an infrared (IR) light illuminator and a visible light illuminator and wherein the at least one camera comprises at least one camera configured for sensing IR light and visible light.

13. A method for utilizing a dot pattern to perform depth detection with a camera system, the method comprising:
projecting an infrared (IR) dot pattern into an environment having one or more objects within a field of view of the camera system and that is reflected off of the one or more objects as reflected dot pattern light, the dot pattern comprising a replicated sub-pattern having a predefined height and width, the replicated sub-pattern comprising a plurality of dots arranged such that the replicated sub-pattern omits any two patches that include an identical arrangement of dots, the any two patches having a height that corresponds with the predefined height of the replicated sub-pattern and including at least one dot of the plurality of dots, the replicated sub-pattern being replicated in at least one of a first direction or a second direction that is perpendicular to the first direction, and such that the dot pattern comprises a plurality of replicated sub-patterns that are adjacently positioned within the field of view;
obtaining a first image of the reflected dot pattern light with a camera system;
using the first image of the dot pattern light to perform at least depth detection.

14. The method of claim 13, wherein the dot pattern comprises the replicated sub-pattern replicated in both the first direction and the second direction.

15. The method of claim 13, wherein the camera system includes a first camera that obtains the first image of the reflected dot pattern light and a second camera that obtains a second image of the reflected dot pattern light and wherein the predefined width of the sub-pattern corresponds to a predetermined maximum disparity search distance over which the system will search for matching pixel patches.

16. The method of claim 15, wherein the method further includes performing stereo matching between the first image and the second image to further perform depth detection.

17. The method of claim 15, wherein the method further includes determining a first pixel patch matches a second pixel patch.

18. The method of claim 17, wherein the determining the first pixel patch matches the second pixel patch is based on determining a similarity of dot pattern of light detected in the first image patch and the second image patch.

19. The method of claim 18, wherein the first and second image patches have illuminated pixels that span an entire height that corresponds to the predefined height of the linear section.

20. The method of claim 15, wherein the method further comprises:
reprojecting the first and second images to generate a first rectified image and a second rectified image, respectively, wherein the first rectified image includes a first plurality of scanlines and the second rectified image includes a corresponding second plurality of scanlines, the first and second pluralities of scanlines extending parallel to each other; and
searching for a match between a first pixel patch in the first plurality of scanlines and a second pixel patch in the second plurality of scanlines.

* * * * *